March 5, 1940.                F. W. HECKERT                2,192,588
                    DRIVE AND SEAL FOR PUMPS AND THE LIKE
                         Filed April 27, 1938          2 Sheets-Sheet 1
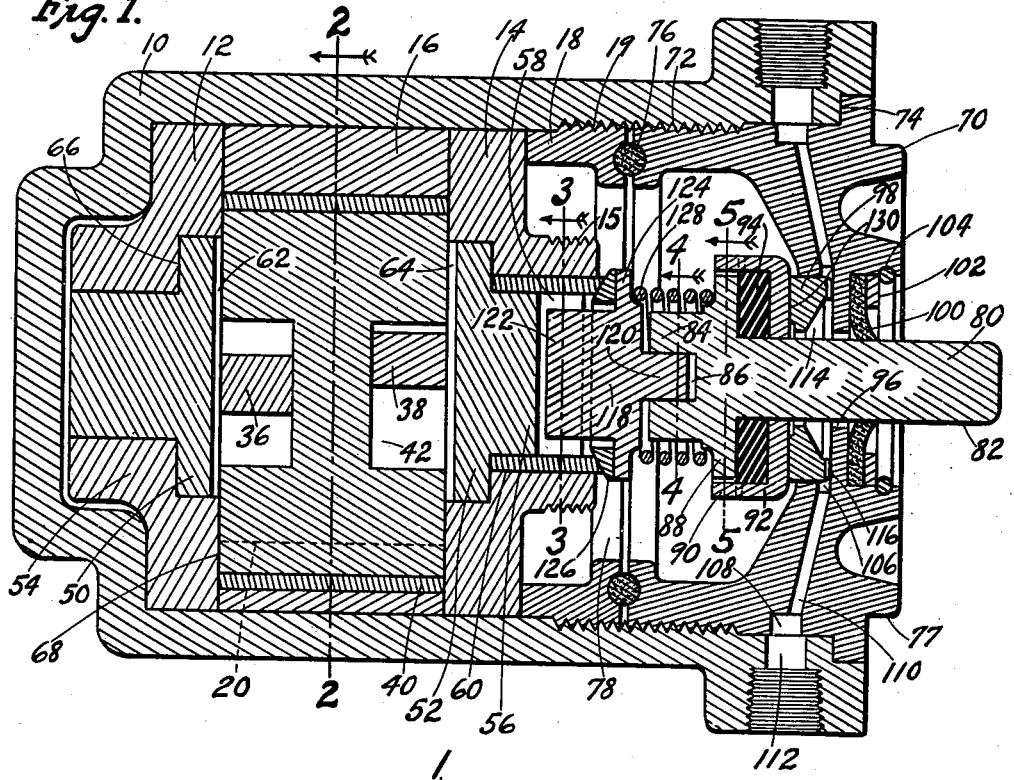
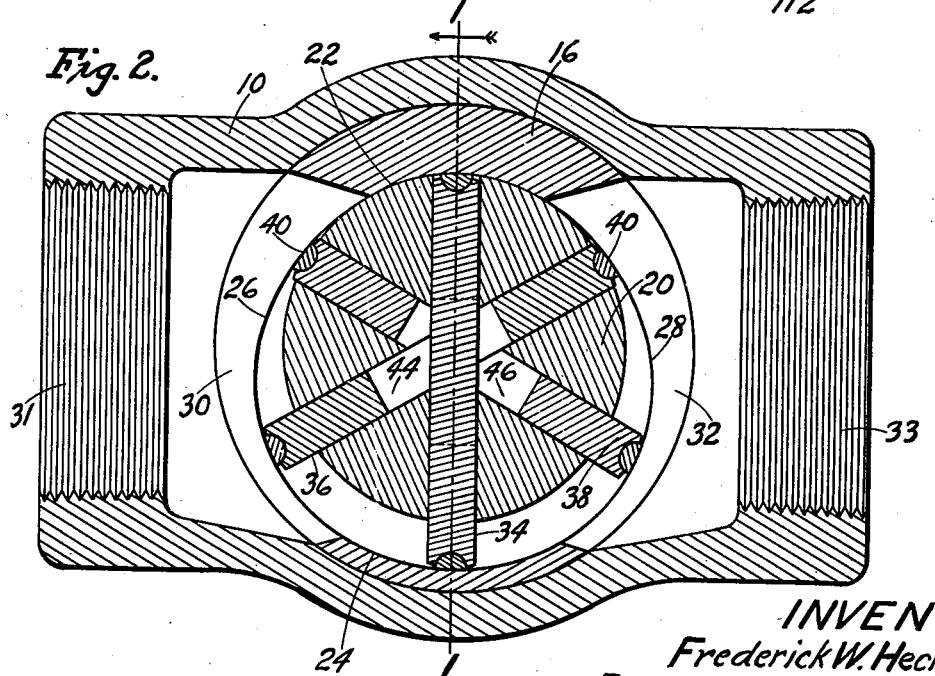
INVENTOR
Frederick W. Heckert
By Frederick W. Cotterman
Att'y March 5, 1940. F. W. HECKERT 2,192,588
DRIVE AND SEAL FOR PUMPS AND THE LIKE
Filed April 27, 1938 2 Sheets-Sheet 2

INVENTOR
Frederick W. Heckert
By Frederick W. Cotterman
Att'y

Patented Mar. 5, 1940

2,192,588

UNITED STATES PATENT OFFICE 2,192,588

DRIVE AND SEAL FOR PUMPS AND THE LIKE

Frederick W. Heckert, Oakwood, Dayton, Ohio, assignor to Curtis Pump Company, Dayton, Ohio, a corporation of Ohio Application April 27, 1938, Serial No. 204,655

7 Claims. (Cl. 103—138)

This invention relates to power driven pumps and particularly to an improved driving shaft mechanism and an improved shaft sealing mechanism for a pump of this class.

Pumps of the character herein shown, particularly when employed in aircraft or motor vehicle service, are usually mounted directly on engines to which they are accessory, and are drivably connected thereto, in which case it often happens that, due to inaccuracies in the machining of the pump or of the engine, their respective shafts are slightly misaligned.

This misalignment may consist in a displacement of the desired coaxial relation between the pump and engine shafts which leaves their respective axes offset but parallel with each other, or it may consist of a displacement which positions the respective axes at an angle, one with the other, or, in other cases the axes may be both offset and at an angle in the same mounting.

With probabilities that such misalignment usually is present in some degree, it is desirable that the engine and pump shafts be connected by means of a joint which is fully universal in its driving action, as otherwise there results a binding action on the several bearings which is highly injurious thereto.

It is equally important that any universal joint which is provided should operate without the slightest backlash, as otherwise a continuous clatter will be present due to the variation of speed and load conditions in such an installation.

Joints depending for their universality on pins driving in loose holes, or tongues driving in loose slots, or similar devices passing as universal joints are entirely unsuitable to carry out the objects of this invention.

Inasmuch as the conservation of space is an important factor, the axial length of any joint used must be kept at a minimum.

It is therefore an object of this invention to provide a short, fully universal coupling mechanism which will permit considerable misalignment of the respective axes of the pump and engine shafts whether angular, offset, or both, with no backlash under any driving condition.

It is well known that, in a pump of the character disclosed, the bearing thru which the rotatable element of the pump extends for connection to a power source must be provided with some sort of a seal or stuffing box to prevent leakage of the fluid being pumped, thru the slight space between the shaft and journal.

Where a pump of the character shown is mounted directly on an engine, or on a gear box containing oil, particularly when the pump is being employed for moving engine fuel, it is not only desirable to prevent the loss of fuel escaping thru the pump journal, but it is still more important to prevent the escaping fuel finding its way into the engine where it dilutes the engine's lubricating oil supply.

It is also desirable to prevent the gritty worn lubricating oil which usually comes from the end of an engine bearing from finding its way thru the pump bearing into the pump where it may not only affect the fuel but may injure the working parts of the pump.

It is therefore a further object of the invention to provide a simple and effective sealing means associated with the coupling means which will prevent leakage of fluid from the pump finding its way into the engine, or leakage of fluid from the engine finding its way into the pump, regardless of whether the axes of the pump and engine are accurately aligned or are misaligned angularly, offset, or both.

Other objects and advantages will be obvious to those skilled in the art as the invention is further described and reference is had to the drawings, wherein, Fig. 1 is an axial section thru a rotary pump having coupling and sealing means embodying my invention. The section is taken on the line 1—1 of Fig. 2.

Fig. 2 is a transverse section thru the pump taken on the line 2—2 of Fig. 1 showing the pump rotor and vanes.

Similar numerals refer to similar parts thruout the several views.

Figure 3:
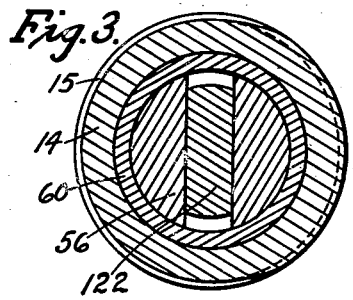
Fig. 3 is a transverse section thru the front pump bearing and coupling member, taken at 3—3 of Fig. 1, showing one close fitting tongue and slot driving connection.
Figure 4:
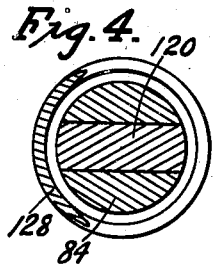
Fig. 4 is a transverse section thru the coupling member and drive shaft, taken at 4—4 of Fig. 1, showing the other close fitting tongue and slot driving connection.
Figure 5:
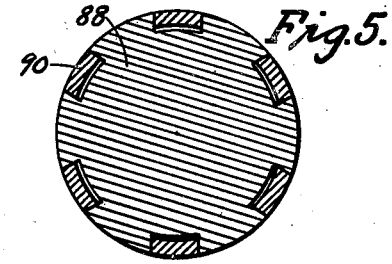
Fig. 5 is a transverse section thru the drive shaft and sealing member, taken at 5—5 of Fig. 1, showing the driving connection between the drive shaft and the sealing member.

The illustrative embodiment of my invention herein shown and described comprises a pump body 10 having closely fitted therein a rear bearing member 12, a front bearing member 14 and a pump cylinder 16 between them. A clamp nut 18 threaded at 19, holds parts 12, 14 and 16 pressed tightly together in the body. The bearing member 14 is threaded at 15 only to provide means whereby it may be grasped to remove it when necessary.

The outer diameter of the cylinder 12 is circular and concentric with the body 10, the rotor 20 being concentric with the outside of the cylinder. The cylinder bore is offset from the rotor and instead of being circular comprises a series of zones of different curvature. The sealing zone 22 is a circular arc of the same radius as the rotor and fits up closely thereto.

The pumping zone 24 is a circular arc of larger radius but drawn to the same center as the sealing zone. The suction and discharge zones 26 and 28 are curves which join the ends of the sealing and pumping zones and are of such contour that a vane which fits closely between the sealing and pumping zones will fit closely between the suction and discharge zones at any position to which the vanes may be turned.

The cylinder 16 is slotted to provide the suction and discharge ports 30 and 32 which extend circumferentially the length of the suction and discharge zones respectively. The body 10 is tapped at 31 and 33 for the suction and discharge pipes.

Three thru vanes 34, 36 and 38 are employed, each slidable in a rotor slot, the planes of the vanes all passing thru the rotor axis. Rocker seals 40 are rockable in grooves in the ends of the vanes to prevent leakage. There is no sliding movement of a vane in a rotor slot while one end is passing over the sealing zone and the other end is passing over the pumping zone, which is the period during which pumping takes place and the resultant side pressure of the vane on the slot continues.

The several vanes are cut away at the middle as at 42, 44 and 46 so each will clear the others as they slide in the rotor slots. The body of the rotor 20 has hubs 50 and 52 at the ends of smaller diameter than the body itself, the hub 50 being extended at 54 to provide the rear journal for the rotor and the hub 52 being extended forwardly as at 56 and provided with a transverse driving slot 58.

Because of the fact that the extension 56 is slotted as at 58, it would not operate well as a journal, and a sleeve 60 is therefore press fitted over the extension. The outside of the sleeve then acts as a journal, being rotatable in bearing member 14 and tight on extension 56. The rotor slots are longer than the width of the vanes as at 62 and 64 so that any rearward axial pressure on the rotor will be taken at 66 on the face of the hub 50 against the face of the rear bearing member 12, instead of by the edges of the blades against the face 68.

A pump of the type described has no adjustment for wear and it therefore becomes highly important that no side strains be put on the rotor or its bearings by any condition of misalignment of the drive.

An end head 70 is threaded into the body 10 at 72 and shouldered thereagainst at 74. A packing ring 76 is held under pressure in semi-circular grooves in adjacent faces of the nut 18 and head 70 to prevent leakage of pressure from the pressure chamber 78 past the threads 72 and shoulder 74. The front end of the head 70 at 77 is accurately machined as to diameter and concentricity with the pump rotor, this portion being adapted to enter a recess in an engine or other device, from which driving power is taken to align the pump axis with the axis of the power shaft.

Extending from the pressure chamber 78 thru the head 70 is the drive shaft 80 which is squared at the outer end at 82 to be slidably received by a corresponding squared hole in the end of the engine shaft, or other shaft from which power is to be taken.

The inner end of the drive shaft 80 has a hub 84 transversely slotted at 86, the slot being similar to the slot 58 in the rotor extension 56. A flange 88 at the forward end of the hub 84 has a series of lugs 90 extending into slots in the rim of the sealing cup 92. A relatively soft washer 94, preferably of synthetic rubber occupies the space between the bottom of the cup 92 and the flange 88.

The front end of the head 70 has an opening 96 which is considerably larger than the shaft 80 so as to permit axial displacement of the shaft without rubbing the head. Opening 96 is further enlarged interiorly to press fittedly receive the sealing collar 98 and exteriorly to receive the packing washer 100, metal washer 102 and spring retaining ring 104.

An annular groove 106 in the central opening of head 70 and a larger annular groove 108 around the outside of the head are connected by a series of small drain holes 110. A series of holes 112 spaced around the body 10 are tapped so that the most conveniently positioned one may receive a drain pipe, the remainder being plugged. The holes 112 all communicate with the grooves 108. An annular recess 114 in the sealing collar 98 is connected to the groove 106 by a series of radial notches 116 in the outer edge of the collar.

A coupling member 118 has a transverse tongue 120 extending forwardly and closely but slidably fitted to the transverse slot 86 of the drive shaft, and a rearwardly extending transverse tongue 122 closely but slidably fitted into the transverse slot 58 of the rotor.

A flange 124 surrounds the body of the member 118. The front face of the journal sleeve 60 is formed to a spherical contour, the center of the radius of curvature being the center of gravity of resilient washer 94. A washer 126 has a central opening considerably larger than the body of the coupling member 118 which it surrounds, one face of the washer being flat and in contact with the flat face of the flange 124 and the other face being spherical and fitted to the spherical face on the end of the journal sleeve 60.

The washer 126 is in no sense a sealing member and therefore need not be machined accurately or smoothly on either of its faces or diameters. It always rotates at the same speed as the journal sleeve 60 and the flange 124 between which it is held and is therefore not subject to wear. Washer 126 serves as a means to allow parallel displacement of the coupling member 118 by transverse shifting of the member 118 in the loose hole of the washer, and to allow angular displacement of the axes of coupling member 118 by shifting of the spherical face of the washer over the spherically formed end of the journal sleeve 60. Leakage of fluid from the pump into the pressure chamber 78 will be thru the slight running clearance between the outside of the journal sleeve 60 and the inside of the bearing member 14. This leakage is desirable and the washer 126 does not in any manner obstruct it.

A relatively heavy coil spring 128 is under a considerable initial compression between flanges 124 and 88 whereby the front face of the sealing cup 92 is pressed against the rear face of the sealing washer 98 as at 130. These contacting faces are preferably ground, lapped, honed, and polished.

Figure 6:
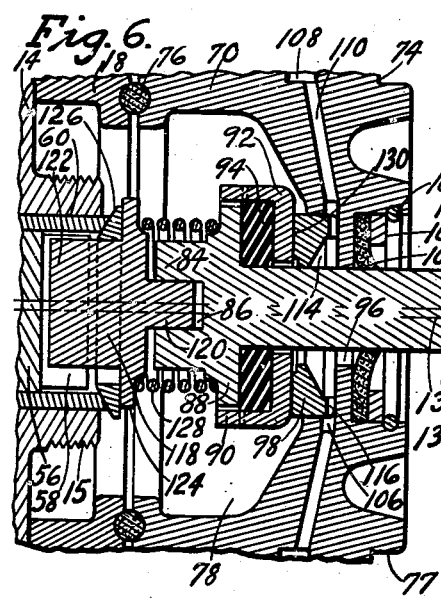
Figs. 6 and 7 are axial sections thru a part of the device showing how the drive shaft may be displaced in a manner which leaves its axis parallel but offset with the axis of the pump rotor.

In Figs. 6 to 9 inclusive, the line 132 represents the axis of the pump rotor. Fig. 6 shows how the drive shaft 80 may be displaced until its axis is on the line 134 which is parallel to the normal axis 132. Due to the close fitting tongue and slot 120—86, the axis of the coupling member 118 is displaced equally with that of the drive shaft, thus shifting the tongue 122 in the slot 58. The body 118 of the coupling member also shifts in the large hole in the washer 126, but the washer does not change its position with respect to the journal sleeve 60.

Figure 7:
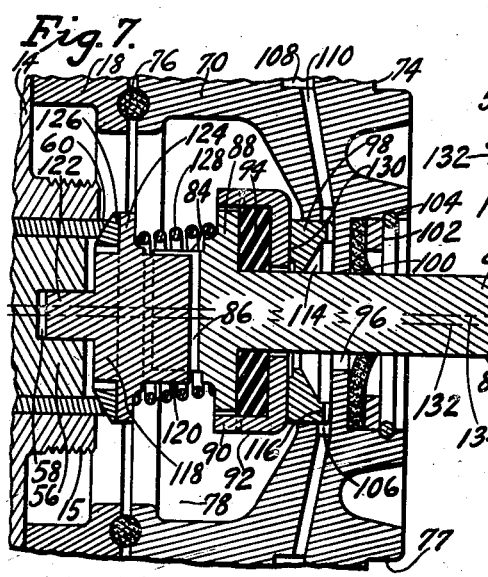

When the drive shaft is rotated ninety degrees from the position shown in Fig. 6 it will appear as in Fig. 7. Here, due to the close fit of the tongue and slot 122—58, the axis of the coupling member has been forced to return to the normal position, i. e., with the coupling member axis on the line 132, the axis of the drive shaft 80 being allowed to remain on the parallel offset line 134 by virtue of the movement of the tongue 120 in the slot 86.

If, therefore, the drive shaft 80 is rotated while its axis is held to the offset line 134, as it may be when the axis of the engine shaft is in parallel misalignment with the pump rotor axis, the axis of the coupling member will move twice per revolution from the line 134 to the line 132, but the spherical washer 126 will maintain its concentric relation with the journal sleeve 60 thruout. The joint at 130 will remain in contact because of pressure exerted by the heavy spring 128 plus the fluid pressure in chamber 78 which will be substantially the pump discharge pressure, this pressure being maintained in chamber 78 by leakage around the journal sleeve 60.

Figure 8:
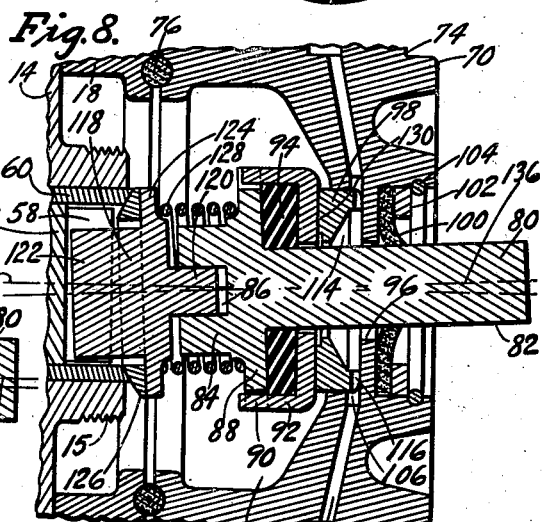
Figs. 8 and 9 are axial sections thru a part of the device showing the drive shaft displaced in a manner which leaves the drive shaft axis at an angle with the pump axis.

Fig. 8 shows how the drive shaft 80 may be so displaced as to bring its axis on the line 136 which is at an angle to the normal axis 132. Because of the close fitting tongue and slot 120—86, the axis of the coupling member is also drawn to the angular line 136 thus shifting the tongue 122 in the slot 58. When the coupling axis is thus angularly displaced the washer 126 moves with it, the spherical surface of the washer shifting over the spherical end of the journal sleeve 60.

Figure 9:
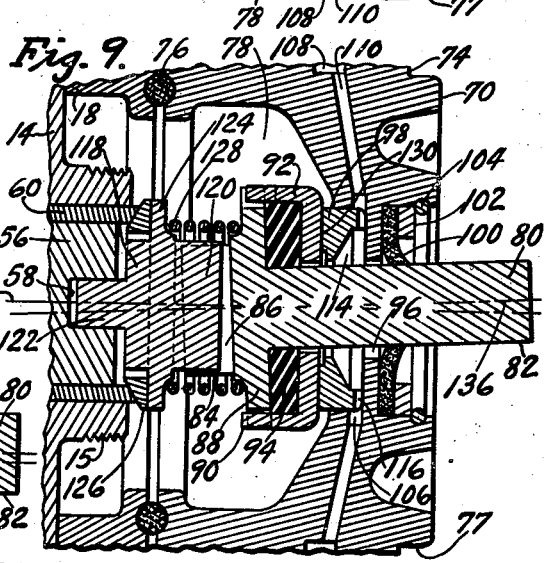

If, while the drive shaft is thus angularly displaced, it is rotated 90 degrees from the position shown in Fig. 8, it will appear as in Fig. 9. Here, due to the close fit of tongue and slot 122—58, the axis of the coupling member has been forced to return to the normal position, i. e., with the coupling member axis on the line 132, the axis of the drive shaft 80 being permitted to remain on the angular line 136 because of the movement of the tongue 120 in the slot 86.

If, therefore, the drive shaft 80 is rotated while its axis is held to the angular line 136, as it may be when the axis of the engine shaft is in angular misalignment with the pump rotor axis, the axis of the coupling member will shift twice per revolution from the angular line 136 to the normal line 132, and the spherical washer will shift twice per revolution from the position in which it is shown in Fig. 8 to the position in which it is shown in Fig. 9.

When the drive shaft 80 is operating at an angle as in Figs. 8 and 9, the relatively soft resilient washer 94 will be thicker on one side and thinner on the other, but the joint at 130 will be held in contact by the spring 128 and the accumulated pressure in chamber 78 which will be substantially the same as the discharge pressure of the pump. The driving lugs 90 which enter notches in the flange 88 insure that relative rotation will always take place between parts 98 and 92 at 130 and not between the washer 94 and its adjacent parts 88 and 92. The lugs 90 in the notches in member 88 do not carry any part of the pump load but merely drive the member 88 against the resistance of friction in the joint 130.

Any slight leakage which may get thru the joint at 130 accumulates in the annular recess 114 and passes thru notches 116 into annular groove 106, thru holes 10 into annular groove 108 and thence out of an opening 112 into a drain pipe.

Similarly, any slight leakage from the engine or other power source which may pass the packing washer 100 will find its way into the annular recess 114 and be disposed of in the same manner as pump leakage.

Obviously other conditions of misalignment will be met by the structure shown, for instance, the squared hole in the power shaft which receives the squared end 82 of the drive shaft 80 may be at an angle with the axis of the power shaft itself, in which case the drive shaft 80 must rotate with a constantly shifting normal axis which it is adapted to do. It will be understood, of course, that the degree of misalignment of the drive shaft with the pump shaft will ordinarily be very slight, the exaggerated misalignment conditions shown in the drawings being adopted for better illustrating the principles of the invention.

In my Patent No. 2,060,209, of November 10, 1936, I have disclosed a similar device wherein complete universality of driving relation as between the drive shaft and pump shaft is accomplished with no backlash and no leakage at the seals. The structure there shown, however, comprises two spherical seats, both of which have relative rotation between stationary and rotating spherical surfaces and must be spherically ground, lapped and polished, so that a convex surface matches a concave surface with sufficient perfection to prevent leakage. There are therefore, in that device four spherical surfaces to be ground, lapped, honed, polished and matched.

In the present device there is only one joint at 130, the two contacting surfaces of which must be ground, lapped, honed, polished and matched. Those two surfaces are flat and therefore present no great difficulty in machining to the accuracy required.

While the washer 126 in the present device has one spherical surface, it does not act as a seal and there is not relative rotation between the washer and its adjacent contacting parts. The washer 126 need therefore be only roughly machined since it acts only as a convenient shoulder to limit axial movement of the coupling member 118 by the spring 128, the thrust of the spring being transferred thru the rotor and taken on the surface 66 without applying end pressure on the vane faces at 68. The tongue and slot drives 120—86 and 122—58 of course must be closely but slidably fitted if backlash is to be effectively prevented.

It will of course be understood that modifications within the spirit of the invention may be made, as, for instance, the coupling member 118 has a tongue at each end which enter slots in the drive shaft and in the rotor, whereas, it may have a slot on each end if the drive shaft and rotor each carry a mating tongue, or the coupling member may have one slot and one tongue if the drive shaft and rotor are correspondingly formed.

While the embodiment shown refers particularly to the combination with a pump it will be obvious that the device will operate as a fluid driven motor, the drive shaft 80 then becoming a power take off member. The conditions requiring sealing against leakage from such a motor would be substantially the same as in a pump.

Having described my invention, I claim,

1. In a pump or fluid motor, a rotor, a vane slidable transversely in a slot in said rotor, said slot being axially longer than the vane is wide leaving clearance space in the slot at the sides of the vane, a rear journal for said rotor having a bearing with the outer end closed, a front journal for said rotor extending thru a front bearing, a pressure tight chamber formed around said front journal end, a drive shaft extending into said chamber at the front end, sealing means on said drive shaft adapted to be pressed against the end of said chamber around said drive shaft, a spring under stress having one end reacting to press the sealing means against the end of said chamber and the other end reacting against the front journal, and end thrust bearing means on said rear journal to limit rearward movement of said rotor by said reaction to an amount which is less than the said clearance space.

2. In a rotatable machine containing a fluid under pressure, a journal extending from one end, a pressure tight enclosure around the extending end and having an opening in the wall opposite said end, a shaft extending loosely thru said opening, a sealing member loose on said shaft adjacent said opening, a flexible washer on said shaft adjacent said sealing member, a flange fast on said shaft adjacent said washer, means drivably connecting said shaft and sealing member, a coupling member between said shaft and journal, a close fitting tongue and slot connection joining the shaft and coupling providing relative movement between the ends of the shaft and coupling in one plane only, a second close fitting tongue and slot connection joining the coupling and journal, providing relative movement between the ends of the coupling and journal in one plane only, the second said plane being ninety degrees rotation from the first said plane, and an axially expansible member having one end resting against said coupling and the other end against said flange.

3. In a rotatable machine having a journal extending from one end, a pressure tight enclosure around the extending end and having an opening in the wall opposite said end, a shaft extending loosely thru said opening, a sealing member loose on said shaft adjacent said opening, a resilient washer on said shaft adjacent said sealing member, a flange fast on said shaft adjacent said washer, driving means for driving said sealing member by said shaft, a coupling member between said shaft and journal, a close fitting tongue and slot connection drivably joining the shaft and coupling and providing relative movement therebetween in one plane only, a second close fitting tongue and slot connection drivably joining the coupling and journal and providing relative movement therebetween in one plane only, the second said plane being ninety degrees rotation from the first said plane, stop means around the outside of the coupling member adapted to engage the end of the journal, and an axially expansible member urging said stop means against said journal and said seal against said end wall.

4. A rotatable machine having a journal extending from one end, a pressure tight enclosure around the extending end and having an opening in the wall opposite said end, a shaft extending loosely thru said opening, a sealing member loosely surrounding said shaft and having one flat face in contact with a flat face on the end wall surrounding said opening, a resilient washer on said shaft adjacent said sealing member, a flange fast on said shaft adjacent said washer, driving means for driving said sealing member by said shaft, a coupling member joining said shaft and journal, a close fitting tongue and slot connection drivably joining the shaft and coupling thereby limiting relative movement between them to one plane only, a second close fitting tongue and slot connection drivably joining the coupling and journal thereby limiting relative movement between them to one plane only, the second said plane being ninety degrees rotation from the first plane, a flange on said coupling, an expansible member between the shaft flange and the coupling flange, and a coupling washer between the coupling flange and the end of the journal, said coupling washer having a flat face in contact with said coupling flange and a spherical face in contact with the end of the journal.

5. The structure defined in claim 4 wherein the center of the sphere, to which the spherical face of the washer corresponds, is the center of gravity of the resilient washer.

6. The structure defined in claim 4 wherein the end of the journal has a spherical seat, the center of which is substantially at the center of gravity of the resilient washer and the coupling washer has a spherical face corresponding thereto and in contact therewith.

7. In combination, a structure having a rotatable journal extending from one end, a pressure tight enclosure around the extending end and having an opening in the wall opposite said end, a shaft extending loosely thru said opening, a sealing member loosely surrounding said shaft and having a flat face in contact with an annular faced surface surrounding the inner end of said opening, a resilient washer on said shaft adjacent said sealing member, a flange fast on said shaft adjacent said washer, loose fitting lug and notch driving connection between said flange and sealing member, a coupling member joining said shaft and journal, a close but slidably fitting tongue and slot connection drivably joining the shaft and coupling thereby limiting relative movement between them to one plane only, a second close but slidably fitting tongue and slot connection drivably joining the coupling and journal, thereby limiting relative movement between them to one plane only, the second said plane being ninety degrees rotation from the first said plane, a flange on said coupling, a spring under compression between the shaft flange and coupling flange, a coupling washer between the coupling flange and the end of the journal, said coupling washer having a flat face in contact with said coupling flange, the other face and the end of the journal being formed spherically with the center of the sphere at the center of gravity of the resilient washer.

FREDERICK W. HECKERT.